Patented Jan. 27, 1953

2,626,912

UNITED STATES PATENT OFFICE 2,626,912

PROCESS FOR BREAKING PETROLEUM EMULSIONS

Melvin De Groote, University City, Mo., assignor to Petrolite Corporation, a corporation of Delaware No Drawing. Application December 1, 1950, Serial No. 198,753

11 Claims. (Cl. 252—341)

The present invention is a continuation-in-part of my co-pending applications, Serial Nos. 104,801 filed July 14, 1949 (now Patent 2,552,528, granted May 15, 1951), 109,619 filed August 10, 1949 (now Patent 2,552,531, granted May 15, 1951), and 107,381 filed July 28, 1949 (now Patent 2,552,530, granted May 15, 1951). This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of my invention is to provide a novel process for breaking or resolving emulsions of the kind referred to. Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipe-line oil.

Demulsification as contemplated in the present application includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is a fractional ester obtained from a polycarboxy acid and a polyhydroxylated material obtained by the oxypropylation of a diamino reactant.

More specifically the present process involves the use of a demulsifying agent which is a fractional ester obtained from a polycarboxy acid and a compound derived in turn by the oxypropylation of ethylenediamine or an equivalent diamine as hereinafter specified, having four terminal hydroxyl radicals or the equivalent, i. e., labile hydrogen atoms susceptible to oxyalkylation.

At first glance the most suitable raw material that could be used is ethylenediamine. Ethylenediamine can be used but it happens that it is available commercially as a mixture containing about 80% of the diamine and about 20% of water. A substantially anhydrous grade at a much higher price is obtainable. Thus, oxypropylation may involve the formation of polypropylene glycol as a by-product which is not particularly desirable. For this reason ethylenediamine which has been reacted with one mole of ethylene oxide and commonly referred to as 2-aminoethylethanolamine or hydroxyethyl ethylenediamine is the most suitable raw material. This raw material is available commercially in anhydrous form. The initial diamino compound must be characterized by (a) having two amino nitrogen atoms and preferably two basic amino nitrogen atoms; (b) freedom from any radical having 8 or more carbon atoms in an uninterrupted group; (c) must be water-soluble, and (d) have four hydroxyl radicals.

It is obvious that ethylene diamine or, better still for reasons above stated, 2-aminoethylethanolamine can be treated with one or more moles of ethylene oxide to yield suitable variants or one or more moles of butylene oxide or a mixture of the two. My preference is to use 2-aminoethylethanolamine as such or after treatment with not over three moles of ethylene oxide. Other derivatives are obvious, i. e., such as those obtained by treating disubstituted ethylenediamine (symmetrically substituted or non-symmetrically substituted) with two moles of glycide. Examples of such compounds are those derived from diphenylethylenediamine, dimethylethylenediamine, etc., followed by subsequent treatment with two moles of glycide. Obviously the substituent radical must not contain 8 or more carbon atoms in an uninterrupted group. For practical purposes it is most satisfactory to employ 2-aminoethylethanolamine.

In amino compounds such as ethylenediamine, for example, the amino hydrogen atoms are susceptible to oxyalkylation and thus it is immaterial whether, broadly speaking, the initial reactant has four labile hydrogen atoms attached to oxygen or four labile hydrogen atoms attached to nitrogen. At the early stage of oxypropylation obviously there must be four terminal hydroxyl radicals. To this extent what is said in this paragraph is a more proper characterization of the initial reactant than the more simple statement appearing previously.

What has been said previously in regard to the materials herein described and particularly for use as demulsifiers with reference to fractional esters may be and probably is an oversimplification for reasons which are obvious on further examination. It is pointed out subsequently that prior to esterification the alkaline catalyst can be removed by addition of hydrochloric acid. Actually the amount of hydrochloric acid added is usually sufficient and one can deliberately employ enough acid, not only to neutralize the alkaline catalyst but also to neutralize the amino nitrogen atom or convert it into a salt. Stated another way, a trivalent nitrogen atom is converted into a pentavalent nitrogen atom, i. e., a change involving an electrovalency indicated as follows:

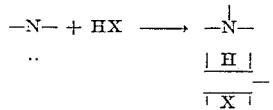

wherein HX represents any strong acid or fairly strong acid such as hydrochloric acid, nitric acid, sulfuric acid, a sulphonic acid, etc., in which H represents the acidic hydrogen atom and X represents the anion. Without attempting to complicate the subsequent description further it is obvious then that one might have esters or one might convert the esters into ester salts as described. Likewise another possibility is that under certain conditions one could obtain amides. The explanation of this latter fact resides in this observation. In the case of an amide, such as acetamide, there is always a question as to whether or not oxypropylation involves both amido hydrogen atoms so as to obtain a hundred per cent yield of the dihydroxylated compound. There is some evidence to at least some degree that a monohydroxylated compound is obtained under some circumstances with one amido hydrogen atom remaining without change.

In the case of higher polyamines there is evidence that all the available hydrogen atoms are not necessarily attacked, at least under comparatively modest oxypropylation conditions, particularly when oxypropylation proceeds at low temperature as herein described, for instance, about the boiling point of water. For instance, in the case of diethylene triamine there is some evidence that one terminal hydrogen atom only in each of the two end groups is first attacked by propylene oxide and then the hydrogen atom attached to the central nitrogen atom is attacked. It is quite possible that three long propylene oxide chains are built up before the two remaining hydrogens are attacked and perhaps not attacked at all. This, of course, depends on the conditions of oxypropylation. However, analytical procedure is not entirely satisfactory in some instances in differentiating between a reactive hydrogen atom attached to nitrogen and a reactive hydrogen atom attached to oxygen.

If this is the case it is purely a matter of speculation at the moment because apparently there is no data which determines the matter completely under all conditions of manufacture, and one has a situation somewhat comparable to the acylation of monoethanolamine or diethanolamine, i. e., acylation can take place involving either the hydrogen atom attached to oxygen or the hydrogen atom attached to nitrogen.

As far as the herein described compounds are concerned it would be absolutely immaterial except that one would have in part a compound which might be the fractional ester and might also represent an amide in which only one carboxyl radical of a polycarboxylated reactant was involved. By and large, it is believed that the materials obtained are obviously fractional esters, for reasons which are apparent in light of what has been said and in light of what appears hereinafter.

Thus, the present invention involves the use, for breaking petroleum emulsions of the water-in-oil type, of a demulsifier including hydrophile synthetic products which are acylation products of (A) a polycarboxy acid with (B) high molal oxypropylation derivatives of diamino compounds which are free from any radicals having at least 8 uninterrupted carbon atoms, which have a molecular weight not over 800 and a plurality of reactive hydrogen atoms, and which are water-soluble, the oxypropylation derivatives being water-insoluble and kerosene-soluble, having a molecular weight in the range of 2,000 to 30,000, with a ratio of proylene oxide to reactive hydrogen atom of the diamino compound within the range of 7 to 70, and with the diamino compound representing not more than 20% by weight of the oxypropylation derivative, the molecular weights and ratios being based upon the assumption of complete reaction between the propylene oxide and the diamino compound and being on a statistical basis, the diamino compound being one in which the nitrogen atoms are linked by an ethylene group, the polycarboxy acid and the oxypropylated derivative being used in molar proportions of one mole of polycarboxy acid for each reactive hydrogen atom in the latter compound.

For convenience what is said hereafter will be divided into four parts:

Part 1 is concerned with the preparation of the oxypropylation derivatives of ethylene diamine or equivalent initial reactants;

Part 2 is concerned with the preparation of the esters from the oxypropylated derivatives;

Part 3 is concerned with the nature of the oxypropylation derivatives insofar that such cogeneric mixture is invariably obtained, and Part 4 is concerned with the use of the products herein described as demulsifiers for breaking water-in-oil emulsions.

PART 1

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low temperature, low reaction rate oxypropylations have been described very completely in U. S. Patent No. 2,448,664 to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

The initial reactants in the instant application contain at least 4 hydroxyl groups and for this reason there is possibly less advantage in using low temperature oxypropylation rather than high temperature oxypropylation. However, the reactions do not go too slowly and this particular procedure was used in the subsequent examples.

Since low pressure, low temperature, low reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the proplyene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivates has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 6-hour period in a single step. Reactions indicated as being complete in 7 or 8 hours may have been complete in a lesser period of time in light of the automatic equipment employed. In the addition of propylene oxide, in the autoclave equipment as far as possible the valves were set so all the propylene oxide if fed continuously would be added at a rate so that the predetermined amount would react within the first 5 hours of the 8-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 8-hour period there would be an unquestionable speeding up of the reaction, by simply repeating the example and using 4, 5 or 6 hours instead of 8 hours.

When operating at a comparatively high temperature, for instance, between 150° to 200° C., an unreacted alkylene oxide such as propylene oxide, makes its presence felt in the increase in pressure or the consistency of a high pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the later stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specially designed for the purpose.

It is to be noted in the present instance one may or may not have basic nitrogen atoms present. For example, if a phenyl radical is attached to each nitrogen atom the initial diamine is substantially nonbasic. However, if one employs 2-aminoethylethanolamine there are present two basic nitrogen atoms and thus the addition of an alkaline catalyst can be eliminated in the early stages of oxypropylation or oxyethylation. This is illustrated subsequently by the fact that oxypropylation was permitted to go through the first stage without the addition of alkaline catalyst.

*Example 1a*

The particular autoclave employed was one with a capacity of approximately 15 gallons or on the average of about 125 pounds of reaction mass. The speed of the stirrer could be varied from 150 to 340 r. p. m. The initial charge was 3.9 pounds of 2-aminoethylethanolamine. In the initial charge no catalyst was added. The reaction pot was flushed out with nitrogen, the autoclave sealed and the automatic devices adjusted and set for injecting 41.73 pounds of propylene oxide in a 3-hour period. The pressure regulator was set for a maximum of 35-37 pounds per square inch. However, in this particular step and in all succeeding steps the pressure never got over 34 pounds per square inch. In fact, this meant that the bulk of the reaction could take place and did take place at an appreciably lower pressure. This comparatively low pressure was the result of the fact that the reactant per se was basic and subsequently considerable catalyst was added. The propylene oxide was added comparatively slowly and, more important, the selected temperature was in the range of 220–225° F., (somewhat higher than the boiling point of water). The initial introduction of propylene oxide was not started until the heating devices raised the temperature to approximately the boiling point of water. At the completion of the reaction a sample was taken and oxypropylation proceeded as in Example 2a immediately following.

*Example 2a*

37.34 pounds of the reaction mass identified as Example 1a were permitted to stay in the reaction vessel and there was added .41 pounds of caustic soda. The mixture was then reacted with 22.45 pounds of propylene oxide. The oxypropylation was conducted in substantially the same manner in regard to pressure and temperature as in Example 1a, preceding. This was true also in regard to the time period. At the end of the reaction period a sample was withdrawn and oxypropylation was continued as described in Example 3a, following.

Example 3a 52.2 pounds of the reaction mass identified as Example 2a, preceding, were permitted to stay in the reaction vessel. 28 pounds of propylene oxide were introduced during a 2-hour period. No additional catalyst was added. The condition of reaction as far as temperature and pressure were concerned were substantially the same as in Example 1a, preceding. At the completion of the reaction part of the reaction mass was withdrawn and the remainder subjected to oxypropylation as described in Example 4a, succeeding.

Example 4a 58.45 pounds of the reaction mass were permitted to stay in the autoclave. No additional catalyst was introduced. Conditions in regard to temperature and pressure were substantially the same as in Example 1a, preceding. In this instance the oxide was added in 4 hours. The amount of oxide introduced was 43.25 pounds. At the end of the reaction period a sample was withdrawn and the remainder of the reaction mass subjected to further oxypropylation as described in Example 5a, following.

Example 5a 77.2 pounds of the reaction mass were permitted to stay in the autoclave. No additional catalyst was introduced. 20.75 pounds of propylene oxide were introduced in the same manner as in Example 1a, preceding. The conditions of temperature and pressure were substantially the same. The time required to introduce the oxide was 3½ hours. At the end of the reaction period a sample was withdrawn and the remainder of the reaction mass subjected to further oxypropylation as described in Example 6a, following.

Example 6a 64.2 pounds of the reaction mass were permited to stay in the autoclave. No additional catalyst was added. This mass was subjected to reaction with 14.75 pounds of propylene oxide. The conditions of reaction were substantially the same as described in Example 1a as far as temperature and pressure were concerned. The period required for the addition of the oxide was 2½ hours.

What has been said herein is presented in tabular form in Table I immediately following with some added information as to molecular weight and as to solubility of the reaction product in water, xylene and kerosene.

Examples 1a and 2a were soluble in water, soluble in xylene and insoluble in kerosene. Example 3a was emulsifiable in water, soluble in xylene, and insoluble in kerosene. Example 4a was somewhat dispersible but largely insoluble in water, soluble in xylene and soluble in kerosene. Examples 5a and 6a were insoluble in water, soluble in xylene, and soluble in kerosene.

The final product, i. e., at the end of the oxypropylation step, was a somewhat viscous amber to reddish colored fluid which was water-insoluble. This is characteristic of all the products obtained from the diamine products herein described. Needless to say if more ethylene oxide radicals were introduced into the initial raw material the initial product is more water-soluble and one must go to higher molecular weights to produce water-insolubility and kerosene-solubility, for instance, molecular weights such as 10,000 to 12,000 or more on a theoretical basis, and 6,000 to 8,000 or 10,000 on a hydroxyl molecular weight basis. If, however, the initial diamino compound is treated with one or more or perhaps several moles of butylene oxide then the reverse effect is obtained and it takes less propylene oxide to produce water-insolubility and kerosene-solubility. These products were, of course, slightly alkaline due to the residual caustic soda employed. This would also be the case if sodium methylate were used as a catalyst.

Speaking of insolubility in water or solubility in kerosene, such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

TABLE 1

| Ex. No. | Composition Before | | | Composition at End | | | | M. W. by Hyd. Determin. | Max. Temp., °F. | Max. Pres., lbs. sq. in. | Time, Hrs. |
|---|---|---|---|---|---|---|---|---|---|---|---|
| | H.C. Amt., lbs. | Oxide Amt., lbs. | Catalyst, lbs. | Theo. Mol. Wt. | H.C. Amt., lbs. | Oxide Amt., lbs. | Catalyst, lbs. | | | | |
| 1a | 3.90 | | | 1,215 | 3.90 | 41.73 | | 1,072 | 220–225 | 35–37 | 3 |
| 2a | 3.19 | 34.15 | 0.41 | 1,950 | 3.19 | 56.60 | 0.41 | 1,610 | 220–225 | 35–37 | 3 |
| 3a | 2.76 | 49.09 | 0.35 | 3,010 | 2.76 | 77.09 | 0.35 | 2,390 | 220–225 | 35–37 | 2 |
| 4a | 2.01 | 56.19 | 0.25 | 5,230 | 2.01 | 99.44 | 0.25 | 3,600 | 220–225 | 35–37 | 4 |
| 5a | 1.53 | 75.49 | 0.18 | 6,650 | 1.53 | 96.24 | 0.18 | 4,510 | 220–225 | 35–37 | 3½ |
| 6a | 1.00 | 63.09 | 0.11 | 8,200 | 1.00 | 77.84 | 0.11 | 5,280 | 220–225 | 35–37 | 2½ |

PART 2

As previously pointed out the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. In the present instance the hydroxylated compounds obtained as described in Part 1, preceding, contain nitrogen atoms which may or may not be basic. Thus, it is probable particularly where there is a basic nitrogen atom present that salts may be formed but in any event under conditions described the salt is converted into an ester. This is comparable to similar reactions involving the esterification of triethanolamine. Possibly the addition of an acid such as hydrochloric acid if employed for elimination of the basic catalyst also combines with the basic nitrogen present to form a salt. In any event, however, such procedure does not effect conventional esterification procedure as described herein.

Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to DeGroote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over para toluene sulfonic acid and that is that at the end of the reaction it can be removed by flushing out with nitrogen, whereas there is no reasonably convenient means available of removing the para-toluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the oxypropylated diamino compound as described in the final procedure just preceding Table 2.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 45% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the sodium sulfate and probably the sodium chloride formed. The clear somewhat viscous straw-colored amber liquid so obtained may contain a small amount of sodium sulfate or sodium chloride but, in any event, is preferably acceptable for esterification in the manner described.

It is to be pointed out that the products here described are not polyesters in the sense that there is a plurality of both polyhydric radicals and acid radicals; the product is characterized by having only one polyhydric radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the polyhydroxylated compound as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

I. B. P., 142° C.        20 ml., 216° C.
5 ml., 200° C.           25 ml., 220° C.
10 ml., 209° C.          30 ml., 225° C.
15 ml., 215° C.          35 ml., 230° C.

40 ml., 234° C.          70 ml., 252° C.
45 ml., 237° C.          75 ml., 260° C.
50 ml., 242° C.          80 ml., 264° C.
55 ml., 244° C.          85 ml., 270° C.
60 ml., 248° C.          90 ml., 280° C.
65 ml., 252° C.          95 ml., 307° C.

After this material is added, refluxing is continued and, of course, is at a higher temperature, to wit, about 160° to 170° C. If the carboxy reactant is an anhydride, needless to say, no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7–3 which appears in numerous instances, is a mixture of 7 volumes of the aromatic petroleum solvent previously described and 3 volumes of benzene. Reference to Solvent #7 means the particular petroleum solvent previously described in detail. This was used, or a similar mixture, in the manner previously described. I have repeated a number of the examples, using decalin or other solvents for the preliminary step of removing the water. There are a variety of other solvents which can be employed.

TABLE 2

| Ex. No. of Acid Ester | Ex. No. of Hydroxy Cmpd. | Theo. Mol. Wt. of H. C. | Theo. Hydroxyl Value of H. C. | Actual Hydroxyl Value | Mol. Wt. Based on Actual H.V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,215 | 185 | 209 | 1,072 | 203 | Diglycollic Acid | 101.2 |
| 2b | 1a | 1,215 | 185 | 209 | 1,072 | 204 | Maleic Anhyd | 74.9 |
| 3b | 1a | 1,215 | 185 | 209 | 1,072 | 203 | Phthalic Anhydride | 113 |
| 4b | 1a | 1,215 | 185 | 209 | 1,072 | 206 | Aconitic Acid | 134 |
| 5b | 1a | 1,215 | 185 | 209 | 1,072 | 203 | Citraconic Anhydride | 161 |
| 6b | 2a | 1,950 | 115 | 140 | 1,610 | 202 | Diglycollic Acid | 67.0 |
| 7b | 2a | 1,950 | 115 | 140 | 1,610 | 202 | Phthalic Anhyd | 74.0 |
| 8b | 2a | 1,950 | 115 | 140 | 1,610 | 201 | Aconitic Acid | 87.0 |
| 9b | 2a | 1,950 | 115 | 140 | 1,610 | 206 | Maleic Anhyd | 63.0 |
| 10b | 2a | 1,950 | 115 | 140 | 1,610 | 204 | Citraconic Acid | 57.0 |
| 11b | 3a | 3,010 | 74.7 | 93.9 | 2,390 | 206 | Diglycollic Acid | 44.0 |
| 12b | 3a | 3,010 | 74.7 | 93.9 | 2,390 | 205 | Phthalic Anhyd | 51.0 |
| 13b | 3a | 3,010 | 74.7 | 93.9 | 2,390 | 205 | Maleic Anhyd | 33.8 |
| 14b | 3a | 3,010 | 74.7 | 93.9 | 2,390 | 211 | Citraconic Anhyd | 39.4 |
| 15b | 3a | 3,010 | 74.7 | 93.9 | 2,390 | 201 | Aconitic Acid | 58.4 |
| 16b | 4a | 5,230 | 39.8 | 62.4 | 3,600 | 202 | Diglycollic Acid | 30.0 |
| 17b | 4a | 5,230 | 39.8 | 62.4 | 3,600 | 204 | Phthalic Anhyd | 33.8 |
| 18b | 4a | 5,230 | 39.8 | 62.4 | 3,600 | 200 | Maleic Anhyd | 21.6 |
| 19b | 4a | 5,230 | 39.8 | 62.4 | 3,600 | 203 | Citraconic Anhyd | 25.0 |
| 20b | 4a | 5,230 | 39.8 | 62.4 | 3,600 | 203 | Aconitic Acid | 39.0 |
| 21b | 5a | 6,650 | 33.8 | 50.7 | 4,510 | 208 | Diglycollic Acid | 24.6 |
| 22b | 5a | 6,650 | 33.8 | 50.7 | 4,510 | 202 | Maleic Anhyd | 17.6 |
| 23b | 5a | 6,650 | 33.8 | 50.7 | 4,510 | 203 | Phthalic Anhyd | 26.6 |
| 24b | 5a | 6,650 | 33.8 | 50.7 | 4,510 | 202 | Aconitic Acid | 31.0 |
| 25b | 5a | 6,650 | 33.8 | 50.7 | 4,510 | 202 | Citraconic Anhyd | 20.0 |
| 26b | 6a | 8,200 | 27.4 | 42.5 | 5,280 | 206 | Diglycollic Acid | 20.9 |
| 27b | 6a | 8,200 | 27.4 | 42.5 | 5,280 | 206 | Phthalic Anhyd | 23.0 |
| 28b | 6a | 8,200 | 27.4 | 42.5 | 5,280 | 206 | Maleic Anhyd | 15.3 |
| 29b | 6a | 8,200 | 27.4 | 42.5 | 5,280 | 208 | Aconitic Acid | 27.2 |
| 30b | 6a | 8,200 | 27.4 | 42.5 | 5,280 | 206 | Citraconic Anhyd | 17.5 |

TABLE 3

| Ex. No. of Acid Ester | Solvent | Amt. Solvent (grs.) | Esterification Temp., °C. | Time of Esterification (hrs.) | Water Out (cc.) |
|---|---|---|---|---|---|
| 1b | #7–3 | 290 | 131 | 3¾ | 13.0 |
| 2b | #7–3 | 279 | 139 | 1¾ | [1] 0.6 |
| 3b | #7–3 | 315 | 154 | 5 | 1.5 |
| 4b | #7–3 | 326 | 194 | 7½ | [1] 13.8 |
| 5b | #7–3 | 288 | 161 | 2 | 0.6 |
| 6b | #7–3 | 260 | 150 | 3 | 8.5 |
| 7b | #7–3 | 276 | 155 | 3 | None |
| 8b | #7–3 | 279 | 188 | 5¾ | 8.0 |
| 9b | #7–3 | 269 | 151 | 2½ | 0.6 |
| 10b | #7–3 | 261 | 140 | 1½ | None |
| 11b | #7–3 | 244 | 148 | 5 | 6.2 |
| 12b | #7–3 | 256 | 143 | 3½ | None |
| 13b | #7–3 | 239 | 133 | 3¼ | 0.3 |
| 14b | #7–3 | 251 | 148 | 3 | None |
| 15b | #7–3 | 254 | 164 | 7¾ | 6.5 |
| 16b | #7–3 | 228 | 167 | 4½ | 4.2 |
| 17b | #7–3 | 238 | 165 | 4½ | 0.1 |
| 18b | #7–3 | 222 | 162 | 2¾ | 0.4 |
| 19b | #7–3 | 228 | 186 | 1¾ | None |
| 20b | #7–3 | 237 | 159 | 3 | 4.1 |
| 21b | #7–3 | 230 | 152 | 3 | 3.5 |
| 22b | #7–3 | 220 | 162 | ¾ | [2] None |
| 23b | #7–3 | 230 | 153 | 3½ | 0.3 |
| 24b | #7–3 | 230 | 161 | 2¼ | 3.1 |
| 25b | #7–3 | 222 | 162 | 1¾ | None |
| 26b | #7–3 | 224 | 183 | 4¼ | 3.5 |
| 27b | #7–3 | 228 | 170 | 4¼ | None |
| 28b | #7–3 | 221 | 155 | 1½ | None |
| 29b | #7–3 | 232 | 158 | 2 | 2.8 |
| 30b | #7–3 | 224 | 155 | 1½ | 4 |

[1] Tended to froth excessively.
[2] Yielded small amount of distillate.

The procedure for manufacturing the esters has been illustrated by preceding examples. If for any reason reaction does not take place in a manner that is acceptable, attention should be directed to the following details: (a) Recheck the hydroxyl or acetyl value of the oxypropylated derivative and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst provided that the hydroxylated compound is not basic; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperature and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to amber in color, and show moderate viscosity. They can be bleached with bleaching clays, filtering chars, and the like. However, for the purpose of demulsification or the like color is not a factor and decolorization is not justified.

In the above instance I have permitted the solvents to remain present in the final reaction mass. In other instances I have followed the same procedure using decalin or a mixture of decalin or benzene in the same manner and ultimately removed all the solvents by vacuum distillation. Appearances of the final products are much the same as the oxypropylated diamino compounds before esterification and in some instances were somewhat darker in color and had a reddish cast and perhaps somewhat more viscous.

PART 3

In the hereto appended claims the demulsifying agent is described as an ester obtained from a polyhydroxylated material having at least four hydroxyls. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated polyhydric materials having 4 or more hydroxyls, or the obvious equivalent.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as HO(RO)$_n$H or —(RO)$_n$H in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the copending application of De Groote, Wirtel and Pettingill, Serial No. 109,791, filed August 11, 1949 (now Patent 2,549,434, granted April 17, 1951).

However, momentarily referring again to a monohydric initial reactant it is obvious that if one selects any such simple hydroxylated compound and subjects such compound to oxyalkylation, such as oxyethylations, or oxypropylation, one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously, as representing both individual constituents in which $n$ has a single definite value, and also with the understanding that $n$ represents the average statistical value based on the assumption of completeness of reaction.

This may be illustrated as follows: Assume that in any particular example the molal ratio of propylene oxide per hydroxyl is 15 to 1. In a generic formula 15 to 1 could be 10, 20, or some other amount and indicated by $n$. Referring to this specific case actually one obtains products in which $n$ probably varies from 10 to 20, perhaps even further. The average value, however, is 15, assuming, as previously stated, that the reaction is complete. The product described by the formula is best described also in terms of method of manufacture.

The significant fact in regard to the oxypropylated diamino compounds, and particularly those obtained from 2-aminoethylethanolamine, is that although the initial products are all water-soluble, in a theoretical molecular weight range in excess of 2,000 depending in part whether the initial product is etherized or not and the size of the etherized radical, one obtains water-insolubility. The product may tend to emulsify or disperse somewhat because some of the constituents, being a cogeneric mixture, are water-soluble but the bulk are insoluble. Thus one gets emulsifiability or dispersibility as noted. Such products are invariably xylene-soluble regardless of whether the original reactants were or not. Reference is made to what has been said previously in regard to kerosene-solubility. For example, when the theoretical molecular weight gets somewhere past 4,000 or at approximately 5,000 the product is kerosene-soluble and water-insoluble. These kerosene-soluble oxyalkylation products are most desirable for preparing the esters. I have prepared hydroxylated compounds not only up to the theoretical molecular weight shown previously, i. e., about 8,000 but some which were twice this high. I have prepared them, not only from 2-aminoethylethanolamine, but also from oxyethylated or oxybutylated derivatives previously referred to. The exact composition is open to question for reasons which are common to all oxyalkylation. It is interesting to note, however, that the molecular weights based on hydroxyl determinations at this point were considerably less, in the neighborhood of a third or a fourth of the value at maximum point. Referring again to previous data it is to be noted, however, that over the range shown of kerosene-solubility the hydroxyl molecular weight has invariably stayed at two-thirds or five-eighths of the theoretical molecular weight.

It becomes obvious when carboxylic esters are prepared from such high molecular weight materials that the ultimate esterification product again must be a cogeneric mixture. Likewise, it is obvious that the contribution to the total molecular weight made by the polycarboxy acid is small. By the same token one would expect the effectiveness of the demulsifier to be comparable to the unesterified hydroxylated material. Remarkably enough, in many instances the product is distinctly better.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., for both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 27b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 27b, 20%;
A cyclohexylamine salt of a polypropylated naphthalene monosulfonic acid, 24%;
An ammonium salt of a polypropylated naphthalene mono-sulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described my invention, what I claim as new and desire to obtain by Letters Patent, is:

1. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters, acidic ester salts, and acidic amido derivatives obtained by reaction between (A) a polycarboxy acid, and (B) high molal oxypropylation derivatives of monomeric diamino compounds, with the proviso that (a) the initial diamino reactant be free from any radical having at least 8 uninterrupted carbon atoms; (b) the initial diamino reactant have a molecular weight of not over 800 and at least a plurality of reactive hydrogen atoms; (c) the initial diamino reactant must be water-soluble; (d) the oxypropylation end product must be water-insoluble, and kerosene soluble; (e) the oxypropylation end product be within the molecular weight range of 2000 to 30,000 on an average statistical basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial diamino reactant must represent not more than 20% by weight of the oxypropylation end product on a statistical basis; (i) the preceding provisos are based on the assumption of complete reaction involving the propylene oxide and initial diamino reactant; (j) the nitrogen atoms are linked by an ethylene chain, and with the final proviso that the ratio of (A) to (B) be one mole of (A) for each reactive hydrogen atom present in (B).

2. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters, acidic ester salts, and acidic amido derivatives obtained by reaction between (A) a polycarboxy acid and (B) high molal oxypropylation derivatives of monomeric diamino compounds, with the proviso that (a) the initial diamino reactant be free from any radical having at least 8 uninterrupted carbon atoms; (b) the initial diamino reactant have a molecular weight of not over 800 and at least a plurality of reactive hydrogen atoms; (c) the initial diamino reactant must be water-soluble; (d) the oxypropylation end product must be water-insoluble, and kerosene-soluble; (e) the oxypropylation end product be within the molecular weight range of 2000 to 30,000 on an average statistical basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial diamino reactant must represent not more than 20% by weight of the oxypropylation end product on a statistical basis; (i) the preceding provisos are based on the assumption of complete reaction involving the propylene oxide and initial diamino reactant; (j) the nitrogen atoms are linked by an ethylene chain; (k) at least one of the nitrogen atoms be basic, and with the final proviso that the ratio of (A) to (B) be one mole of (A) for each reactive hydrogen atom present in (B).

3. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters, acidic ester salts, and acidic amido derivatives obtained by reaction between (A) a polycarboxy acid and (B) high molal oxypropylation derivatives of monomeric diamino compounds, with the proviso that (a) the initial diamino reactant be free from any radical having at least 8 uninterrupted carbon atoms; (b) the initial diamino reactant have a molecular weight of not over 800 and at least a plurality of reactive hydrogen atoms; (c) the initial diamino reactant must be water-soluble; (d) the oxypropylation end product must be water-insoluble, and kerosene-soluble; (e) the oxypropylation end product be within the molecular weight range of 2000 to 30,000 on an average basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial diamino reactant must represent not more than 20% by weight of the oxypropylation end product on a statistical basis; (i) the preceding provisos are based on the assumption of complete reaction involving the propylene oxide and initial diamino reactant; (j) the nitrogen atoms are linked by an ethylene chain; (k) that both nitrogen atoms be basic; and with the final proviso that the ratio of (A) to (B) be one mole of (A) for each reactive hydrogen atom present in (B).

4. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters, acidic ester salts, and acidic amido derivatives obtained by reaction between (A) a polycarboxy acid free from any radical having more than 8 uninterrupted carbon atoms in a single group, and (B) high molal oxypropylation derivatives of monomeric diamino compounds, with the proviso that (a) the initial diamino reactant be free from any radical having at least 8 uninterrupted carbon atoms; (b) the initial diamino reactant have a molecular weight of not over 800 and at least a plurality of reactive hydrogen atoms; (c) the initial diamino reactant must be water-soluble; (d) the oxypropylation end product must be water-insoluble, and kerosene-soluble; (e) the oxypropylation end product be within the molecular weight range of 2000 to 30,000 on an average statistical basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial diamino reactant must represent not more than 20% by weight of the oxypropylation end product on a statistical basis; (i) the preceding provisos are based on the assumption of complete reaction involving the propylene oxide and initial diamino reactant; (j) the nitrogen atoms are linked by an ethylene chain; (k) that both nitrogen atoms be basic; and with the final proviso that the ratio of (A) to (B) be one mole of (A) for each reactive hydrogen atom present in (B).

5. A process for breaking petroleum emulsions of the water-in-oil type characterized by subjecting the emulsion to the action of a demulsifier including hydrophile synthetic products; said hydrophile synthetic products being a cogeneric mixture selected from th class consisting of acidic fractional esters, acidic ester salts, and acidic amido derivatives obtained by reaction between (A) a dicarboxy acid free from any radical having more than 8 uninterrupted carbon atoms in a single group, and (B) high molal oxypropylation derivatives of monomeric diamino compounds, with the proviso that (a) the initial diamino reactant be free from any radical having at least 8 uninterrupted carbon atoms; (b) the initial diamino reactant have a molecular weight of not over 800 and at least a plurality of reactive hydrogen atoms; (c) the initial diamino reactant must be water-soluble; (d) the oxypropylation end product must be water-insoluble, and kerosene-soluble; (e) the oxypropylation end product be within the molecular weight range of 2000 to 30,000 on an average statistical basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial diamino reactant must represent not more than 20% by weight of the oxypropylation end product on a statistical basis; (i) the preceding provisos are based on the assumption of complete reaction involving the propylene oxide and initial diamino reactant; (j) the nitrogen atoms are linked by an ethylene chain; (k) that both nitrogen atoms be basic; and with the final proviso that the ratio of (A) to (B) be one mole of (A) for each reactive hydrogen atom present in (B).

6. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters, acidic ester salts, and acidic amido derivatives obtained by reaction between (A) a dicarboxy acid free from any radical having more than 8 uninterrupted carbon atoms in a single group, and (B) high molal oxypropylation derivatives of 2-aminoethylethanolamine, with the proviso that (a) the oxypropylation end product must be water-insoluble and kerosene-soluble; (b) the oxypropylation end product be within the molecular weight range of 2000 to 30,000 on an average statistical basis; (c) the solubility characteristics of the oxypropylation end product in respect to water and kerosene must be substantially the result of the oxypropylation step; (d) the ratio of propylene oxide per initial reactive hydrogen atom must be within the range of 7 to 70; (e) the initial diamino reactant must represent not more than 20% by weight of the oxypropylation end product on a statistical basis; (f) the preceding provisos are based on the assumption of complete reaction involving the propylene oxide and initial diamino reactant; and with the final proviso that the ratio of (A) to (B) be one mole of (A) for each reactive hydrogen atom present in (B).

7. The process of claim 6 wherein the dicarboxy acid is diglycolic acid.

8. The process of claim 6 wherein the dicarboxy acid is maleic acid.

9. The process of claim 6 wherein the dicarboxy acid is phthalic acid.

10. The process of claim 6 wherein the dicarboxy acid is citraconic acid.

11. The process of claim 6 wherein the dicarboxy acid is succinic acid.

MELVIN DE GROOTE.

REFERENCES CITED

The following references are of record in the file of this patent:

UNITED STATES PATENTS

| Number | Name | Date |
| --- | --- | --- |
| 2,552,530 | De Groote | May 15, 1951 |
| 2,552,531 | De Groote | May 15, 1951 |
| 2,552,534 | De Groote | May 15, 1951 |
| 2,562,878 | Blair | Aug. 7, 1951 |